United States Patent [19]
Inoue et al.

[11] 3,861,509
[45] Jan. 21, 1975

[54] BALK RING FOR SYNCHROMESH APPARATUS

[75] Inventors: Yasuyuki Inoue; Tomoaki Koshio, both of Hiroshima, Japan

[73] Assignee: Toyo Kogyo Co., Ltd., Hiroshima, Japan

[22] Filed: May 21, 1973

[21] Appl. No.: 362,584

[30] Foreign Application Priority Data
May 19, 1972 Japan.......................... 47-59332[U]

[52] U.S. Cl................................ 192/53 F, 192/108
[51] Int. Cl............................................ F16d 23/02
[58] Field of Search.............. 192/53 F, 108; 74/339

[56] References Cited
UNITED STATES PATENTS
2,259,527  10/1941  Manville........................... 192/53 F
2,930,462  3/1960  Willis................................ 192/53 F Primary Examiner—Allan D. Herrmann
Attorney, Agent, or Firm—Sughrue, Rothwell, Mion, Zinn & Macpeak

[57] ABSTRACT

A balk ring for use in a synchromesh apparatus for a power transmission mechanism is disclosed which is formed with ridge-shaped chamfer surfaces at one end of spline teeth thereof. Each of the chamfer surfaces is formed of at least two planes, the one beginning at the apex being steeper than the other which extends from the former. Upon the shifting operation of the power transmission mechanism, the apex of the chamfer surfaces of the sleeve is at first brought into meshing engagement with the steeper plane.

3 Claims, 3 Drawing Figures

PATENTED JAN 21 1975

3,861,509

BALK RING FOR SYNCHROMESH APPARATUS

BACKGROUND OF THE INVENTION

The present invention relates to improvements in a synchromesh apparatus of inertia lock type for use with an automotive power transmission mechanism, and, more particularly, to improvements in chamfer surfaces of a balk ring of the above synchromesh apparatus with an improved synchronizing operation.

DESCRIPTION OF THE PRIOR ART

Heretofore, a balk ring for use in a synchromesh apparatus of inertia lock type has its spline teeth formed with simple plane chamfer surfaces. When in the shifting operation, the apex of the two chamfer surfaces formed at the end of a spline tooth of a sleeve is brought into abutting engagement with one of the chamfer surfaces of the above balk ring. Then, the particular apex slides on the chamfer surface into fitting engagement with a spline groove of the balk ring. If, at this instant, the balk ring and the gear are in synchronism with each other, no mechanical problem will be brought about. If, on the other hand, a fully synchronized condition has not been accomplished, the engaging portions will chatter or the shifting operation will not be attained as a result of the improper meshing.

Since each of the chamfer surfaces is formed of a simple flat plane as has been described in the above, the sliding speed of the spline apex of the sleeve will, when in the shifting operation, vary with the chamfer angle. More specifically, the larger is the chamfer angle, the more slidable becomes the spline apex to shorten the time period during which the sleeve is fitted into the spline groove of the balk ring. To the contrary, the smaller is the chamfer angle, the less slidable becomes the splined apex to lengthen the above time period.

This time period is one of the most important factors determining the quality of the synchronizing condition. That is to say, if this time period is shorter than that required for completion of synchronism, the resultant synchronism will be degraded. If, on the contrary, the time period is longer than that for completion of synchronism, then the balk ring is excessively pressed on the gear to invite wearing of the tapered portion of the balk ring. In this latter case, the resultant synchronism will also be degraded.

With these in mind, the improper synchronism can be theoretically obviated by simply selecting a value of the chamfer angle suitable for equalizing the above two time periods. However, a considerable clearance cannot be dispensed with so as to offer smooth sliding to the sleeve, and due to the existence of the clearance the angle, at which the apex of the sleeve abutts upon the chamfer surface, varies so much in accordance with the changing modes of the driving operations as to make it impossible to obviate the improper synchronism.

Since, moreover, an automotive vehicle is used for a long time period and the use frequency of the synchromesh apparatus under consideration is markedly high, the chamfer angle itself will be deviated from its most proper value as a result of the wearing of the apex portion, even though the finishing of the chamfer angle is made highly precisely.

SUMMARY OF THE INVENTION

It is, therefore, a primary object of the present invention to provide a balk ring for use in a synchromesh apparatus which is free from the conventional drawbacks concomitant with improper synchronism even after a prolonged time period of use.

Another object of the present invention is to provide a balk ring, in which each of the chamfer surfaces of the spline teeth is formed of at least two steep and continuing gentle planes so as to ensure a proper time period for completion of synchronism and to prevent excessive wearing of the tapered surface due to its being highly pressed onto the chamfer angle.

Still another object is to provide a balk ring, in which each of the chamfer surfaces is formed of a steep plane, a gentle plane continuing therefrom and a steep plane further continuing from the gentle plane.

BRIEF DESCRIPTION OF THE DRAWING

Other objects and advantages of the present invention will be apparent from the following description make in connection with the accompanying drawing, in which.

DESCRIPTION OF THE PREFERRED EMBODIMENTS

Figure 1:
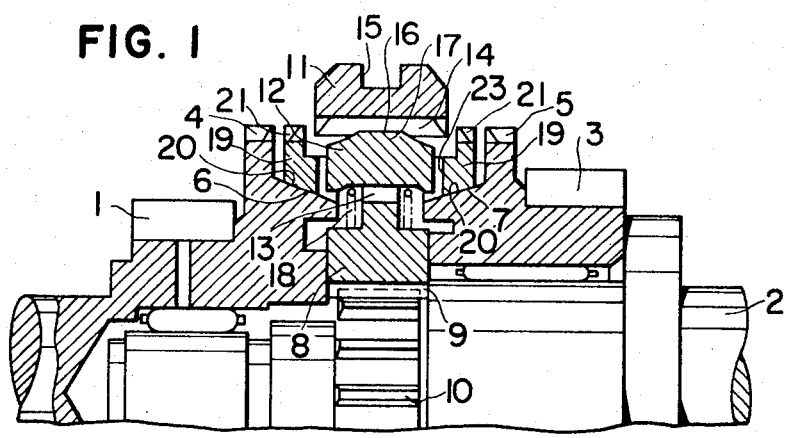
FIG. 1 is a vertical sectional view showing essential portions of a synchromesh apparatus of inertia lock type according to the present invention.

The embodiments of the present invention will now be described with reference to FIGS. 1 and 2. As shown, a main drive gear 1 operates to transmit a driving force from an internal combustion engine or an electric motor through a clutch to a main shaft 2, which in turn transmitts the received driving force through a counter gear of a counter shaft to a propeller shaft. An idler gear 3 is rotatably attached to the main shaft 2 and is driven by the main drive gear 1 through the counter gear. The main drive gear 1 and the idler gear 3 are integrally provided with clutch gears 4 and 5 which in turn are respectively provided with taper cones 6 and 7. A synchronizer hub 8 is fitted in an outer peripheral spline 10 of the main shaft 2 through its inner peripheral spline 9, and accordingly is integrally rotated with the main shaft 2. The synchronizer hub 8 is formed at its outer periphery with a spline, which is in meshing engagement with a sleeve 11, and with three key grooves 13 in which a synchronizer key 12 is fitted. With the synchronizer key 12 being fitted in the key groove 13, the sleeve 11 has its spline 14 meshing with the spline of the synchronizer 8 and is movable along its axis.

The sleeve 11 is formed at its outer periphery with a shift fork groove 15, in which a shift fork is fitted, and with a groove 16 which is disposed along its periphery and at the center of the inner peripheral spline 14.

The synchronizer key 12, which is fitted in the three key grooves 13, is pressed onto the spline 14 of the sleeve 11 by the radially biasing action of a synchronizer key spring 18. The synchronizer key 12 is formed with a projection 17 which is fitted in the groove 16 of the spline 14.

Balk rings 19 and 19 are fitted respectively in the taper cones 6 and 7 of the clutch gears 4 and 5 so as to transmit rotational motion by the frictional force established inbetween. For this purpose, the balk ring 19 is formed at its inner periphery with a taper surface 20 corresponding to the taper cones 6 and 7. This taper surface 20 is threaded with fine grooves. The balk ring 19 is, on the other hand, formed at its outer periphery with a spline 21 which is in meshing engagement with the spline 14 of the sleeve 11. A chamfer angle is given to the portion of the balk ring 19 which faces the sleeve 11. Thus, the balk ring 19 has two chamfer surfaces 22 for its one spline tooth.

At the side of the balk ring 19, there are formed three equi-distantly divided grooves 23, in which the synchronizer key 12 is fitted. The breadth of this groove 23 is determined slightly larger than that of the synchronizer key 12, thus regulating the contact points of the apex T which is located at the end of the spline 14 of the sleeve 11.

Figure 2:
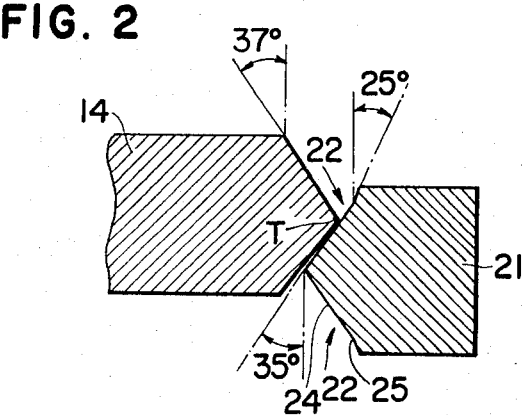
FIG. 2 is an enlarged horizontal sectional view showing a balk ring of the present invention together with a spline of a sleeve to mesh therewith.

As better shown in FIG. 2, the chamfer surfaces 22 of the balk ring 19 are two in number and located at the end of the spline 21 in a manner to form a symmetrical ridge. This chamfer surfaces 22 are each composed of a steeply inclined plane 24 relative to a plane normal to the axis of sleeve 14 extending from the apex of the ridge, and of a correspondingly gently inclined plane 25 continuing from the steep plane 24. The steep plane 24 has a chamfer angle of 35°, while the gentle plane 25 has a chamfer angle of 25°. In this respect, the breadth of the groove 23 of the balk ring 19 is firstly brought into contact with the steep plane 24 when the shifting operation is carried out.

When, in operation, the automotive vehicle is running at the top gear of its four forward gearing ratios (that is, with use of the main drive gear 1 of FIG. 1), then the spline 14 of the sleeve 11 is in meshing engagement with the clutch gear 4 which is integral with the main drive gear 1. In this instance, the driving force is transmitted from the main drive gear 1 through the clutch gear 4, the sleeve 11 and the synchronizer hub 8 to the main shaft 2, which is thus rotated at the same speed as that of the main drive gear 1. When, on the other hand, it is intended to shift the automotive vehicle into the third gearing ratio (namely, with use of the idler gear 3 of FIG. 1), then the shift fork connected to a shift lever is manually moved to slide the sleeve 11 in the rightward direction so as to establish a neutral condition. Since, in this neutral condition, the above power transmitting elements are disconnected from each other, the third gear 3 and the main drive gear 1, which have been rotating at a slower speed than that of the sleeve 11 due to the top gearing ratio, start to decelerate. In this instance, the main shaft 2 itself is driven by the running wheels, and as such it is not decelerated so abruptly. Thus, the speed diferential between the third gear 3 and the sleeve 11 grows larger and larger.

Then, the sleeve 11 is further slide rightwardly by way of the shift fork, the sleeve 11 and the synchronizer key 12 are first moved slightly in the same direction to thereby have the right end of the synchronizer key 12 press the balk ring 19 in the rightward direction. As a result, the taper surface 20 of the balk ring 19 is brought into contact with the taper cone 7, so that the third gear 3 is about to be rotated at the same speed as that of the sleeve 11 to thereby trail the balk ring 19. Thus, the balk ring 19 starts to be moved along the clearance which is formed between the synchronizer key 12 and its groove 23.

It should be noted here that the spline 14 of the sleeve 11 is staggered or circumferentially offset relative to the spline 21 of the balk ring 19. This is because, since the breadth of the groove of the balk ring is previously determined at a value, as has been described, the apex T of the ridge of the spline 14 of the sleeve 11 is, at this particular instant, facing the steep plane 24 of the balk ring 19. When the sleeve 11 is still further moved in the rightward direction, the synchronizer key 12 abutts upon the bottom of the groove 23 of the balk ring 19 to stop. Then, the projection 17 of the synchronizer key 12 is released from the engagement with the groove 16 of the spline 14 of the sleeve 11. At this instant, the apex T of the spline 14 of the sleeve 11 is pressed upon the steep plane 24 of the chamfer surface 22 of the balk ring 19. As a result, the apex T of the sleeve 11 is forced to slide on the steep plane 24 to press the taper surface 20 of the balk ring 19 onto the taper cone 7 of the third gear 3, thus bringing the balk ring 19 into synchronous engagement with the third gear 3 in a progressive manner as a result of the increase in the frictional torque of the same direction. With the plane 24 of the balk ring 19 being sufficiently steep, the apex T quickly slides thereon to abut upon the continuous gentle plane 25, so that the level of the frictional torque is further elevated to ensure sufficient synchronizing operation inbetween. After this synchronizing operation has been completed, some vibratory motions are established to make the apex T slide over the gentle plane 25 to be fitted into the spline 5 of the third gear 3. In these ways, the shift-down operation to the third gearing ratio is finished.

As has been described in the above, the present invention is characterized in that the apex T of the spline 14 of the sleeve 11 is firstly pressed onto the steep plane 24 of the chamfer surface 22 of the balk ring 19 to quickly slide thereon, and is secondly moved toward the gentle plane 25, at which the synchronizing operation is effectively completed.

More detailed discussion will now be made on the steep and gentle planes 24 and 25. Since the apex T of the sleeve 11 is highly reluctant to slide on the gentle plane 25, this plane 25 is required to have such a small stroke as to immediately release the apex T with the aid of the vibrations just after the synchronizing operation has been completed. On the other hand, the chamfer angle of the steep plane 24 is determined by the conditions, under which the apex T of the spline 14 of the sleeve 11 slides thereon, preferably at an angle larger than about 33°. In this connection, the chamfer angle of the sleeve 11 is determined at a value larger than 35° so as to have its apex T contact with the chamfer surface 22 of the balk ring 19. Another requirement of the gentle plane 25 is, on the other hand, to have such a chamfer angle as to prevent the apex T from being disengaged therefrom until the synchronizing operation is completed. For this purpose, the chamfer angle of the gentle plane 25 is sufficient for the requirement if it is located within the range from 0° to 30°.

Figure 3:
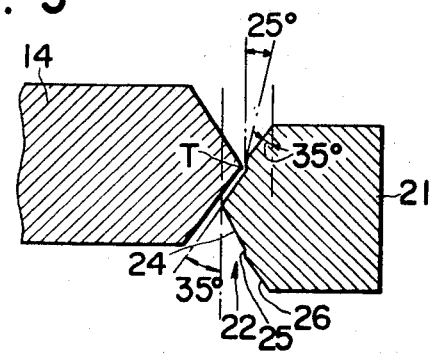
FIG. 3 is similar to FIG. 2 but shows another embodiment of the present invention.

Turning now to FIG. 3, the chamfer surface of the balk ring 19 is formed with three planes, that is to say, a third steep plane 26 continuing from the gentle plane 25, in addition to the two planes 24 and 25, so as to change the contacting characteristics during the shifting operation. In this second embodiment, it should be noted that the apex T of the sleeve 11 at first abut upon the first steep plane 24 or, as the case may be, upon the second gentle plane 25. The groove 23 of the balk ring 19 is so preset as to meet the above requirement. In a modification, the first and third steep planes 24 and 26 are further composed of multiple plane components, is desired.

As has been described in the above, the present invention should be appreciated in that the synchronizing operation can be ensured by providing a steep plane and a continuous gentle plane in the chamfer surface of the balk ring, in that after completion of the synchronizing operation the sleeve is quickly brought into meshing engagement with the gear to prevent chattering of the gear teeth which may often result from insufficiency of the time period for the synchronizing operation; in that after the synchronizing operation an excessive wearing of the taper surface is obviated which may result from continuing excessive press of the balk ring, and in that the balk ring can be used with a sufficient synchronizing operation for a prolonged time period.

What we claim is:

1. A balk ring for use in a synchromesh apparatus of the inertia lock type, wherein said balk ring is axially slidable on a clutch gear upon contact on one side by an axially slidable sleeve spline to effect synchronism with said clutch gear, and wherein said balk ring includes an inner peripheral tapered surface frictionally engaging the tapered cone of said clutch gear and being slidably supported thereby and said balk ring includes a plurality of outer peripheral splines formed with ridge-shaped chamfer surfaces as the end facing said sleeve, the improvement comprising: each of said chamfer surfaces including a first inclined plane extending from the apex of said chamfer surface and a second inclined plane extending from said first plane, and the chamfer angle of said first plane relative to a plane perpendicular to the direction of movement of said sleeve spline being larger than that of the second plane.

2. A balk ring according to claim 1, characterized in that the chamfer angle of said first plane is larger than 33° while the chamfer angle of said second plane resides in the range from 0° to 30°.

3. A balk ring according to claim 1, characterized in that said each of said chamfer surfaces further includes a third inclined plane extending from said second plane, and in that the chamfer angle of said third plane is larger than that of said second plane.

* * * * *